United States Patent [19]

Dupin

[11] Patent Number: 4,594,168

[45] Date of Patent: Jun. 10, 1986

[54] DERIVATIVES OF LIGNOSULFONIC ACID

[75] Inventor: Jean-Louis Dupin, Tartas, France

[73] Assignee: L'Avebene, Paris, France

[21] Appl. No.: 692,856

[22] Filed: Jan. 17, 1985

Related U.S. Application Data

[63] Continuation of Ser. No. 557,380, Dec. 1, 1983, abandoned, which is a continuation of Ser. No. 235,752, Feb. 18, 1981, abandoned.

[30] Foreign Application Priority Data

Feb. 27, 1980 [FR] France ................................. 80 04351
Jan. 29, 1981 [FR] France ................................. 81 01695

[51] Int. Cl.$^4$ ............................ C08H 5/02; C09K 7/02
[52] U.S. Cl. ................................... 252/8.5 C; 530/500
[58] Field of Search .................... 252/8.5 A, 8.5 C; 260/124 R; 530/500

[56] References Cited

U.S. PATENT DOCUMENTS

| | | | |
|---|---|---|---|
| 2,935,504 | 5/1960 | King et al. | 252/8.5 X |
| 3,087,923 | 4/1963 | King et al. | 260/124 |
| 3,095,409 | 6/1963 | King et al. | 252/8.5 X |
| 4,220,585 | 9/1980 | Javora et al. | 260/124 |

*Primary Examiner*—Herbert B. Guynn
*Attorney, Agent, or Firm*—Burgess, Ryan & Wayne

[57] ABSTRACT

Process of preparation of lignosulfonic acid derivatives, whereby, in a pressure and corrosion resistant closed container, the following steps are carried out:

heating for 1 minute to 30 minutes, at temperatures within a range of 115° C. to 160° C., a mixture of a lignosulfonic acid aqueous solution having a pH value lower than 3, containing from 100 g to 600 g of the said acid per liter, with a multivalent-metals free oxidizing agent supplying from 0.5 g to 2 g oxgen per 100 g lignosulfonic acid to form a reaction mixture;

neutralizing the reaction mixture with an alkaline solution having a pH value at least equal to 5, in order that the obtained transformed lignosulphonic acid, after concentration or desiccation in powder, may be directly used.

5 Claims, No Drawings

DERIVATIVES OF LIGNOSULFONIC ACID

This application is a continuation of application Ser. No. 557,380, filed Dec. 1, 1983, which is a continuation of application Ser. No. 235,752, filed Feb. 18, 1981, both now abandoned.

BACKGROUND OF THE INVENTION

The present invention concerns novel lignosulfonic acid derivatives, their process of preparation and their use for the preparation of drilling and packer muds.

U.S. Pat. No. 3,087,923 describes a process for the transformation of lignosulfonate in such a way as to obtain products to be used as additives for drilling muds. It was mentioned therein that various oxidizing agents and wide operating conditions were able to be used although in practice the products always contained chromium or iron salts (or more generally multivalent metals) for which metallic derivatives play a determining role in the oxidizing process.

The present invention relates to the obtention of lignosulfonic acid derivatives which can be used as additives to fluids used for the drilling and completion of wells comprising the following steps:

heating at 115° C. to 160° C. in a closed container for a period of 1 to 30 minutes a mixture of a lignosulfonic acid aqueous solution having a pH lower than 3, containing 100 g to 600 g lignosulfonic acid per liter, and an oxidizing agent supplying 0.5 g to 2 g oxygen per 100 g lignosulfonic acid;

neutralizing the product obtained by an alkaline solution having a pH at least equal to 3.5;

possible drying of the product:

The oxidizing agents are selected from among the multivalent metal free oxidizing agents group, such as hydrogen peroxide, ozonised oxygen, and alkaline chlorites and hypochlorites in such a way as to obtain lignosulfonic derivatives free of multivalent metal, such as chromium and iron.

The feed for the present invention is a lignosulfonic acid having a pH lower than 3. This acid is formed from a mixture of acids, product of the acidification of the lignosulfonates resulting from the black liquor of the paper-making process known as "the bisulphite process".

The acidification may be carried out by any known means such as the action of a strong acid generating an insoluble salt, for example, sulfuric acid in the case of calcium lignosulfonate, or as the passage of the product over an ion exchanger resin.

The lignosulfonic acid is used in the form of an aqueous solution containing 100 g to 600 g of acid per liter of solution; the pH value of such a solution is lower than 3 and often lower than 1.

The solution is mixed with a non-metallic oxidizing agent, supplying between 0.5 and 2 g oxygen per 100 g lignosulfonic acid. The mixture is brought to a temperature in the range of 115° C. to 160° C., in a pressure and corrosion resistant closed container.

The reaction is carried out continuously or discontinuously during 1 to 30 minutes according to the temperature, the concentration of the reactants and the properties sought from the reaction product. The reaction durations vary by inverse function to the temperature and/or concentration of the reactants—all other things being equal.

If the temperature is too high the product obtained, after cooling, is a rigid gel only slightly soluble in water. What is referred to above as the reaction duration, at a given temperature, is the period during which the mixture remains at the said temperature, taking into account the duration of heating, this heating preferably being carried out fairly quickly, and not taking into account duration of the cooling, which is carried out by circulation of a cooling fluid throughout the reactor.

At the end of the reaction and after cooling, the solution is at least partially neutralized; the purpose of this neutralization is to bring the pH from below 1 to a value at least equal to 3.5. This neutralization is carried out through use of a base, such as NaOH, KOH or, in certain specific cases, calcium or magnesium oxide.

The product may possibly be dried; the dried product has the appearance of a dark-coloured powder.

The products such as described herein-above may be used for example as additives for drilling and completion fluids, either in the form of the obtained aqueous solution, or in the form of a dry powder. They have the essential advantage, over currently known lignosulfonate-based products, of being free of heavy multivalent metals, and with respect to the other properties sought:

reduction of the apparent and plastic viscosity of the slurries, reduction of thixotropy, increase of water retention capacity, the products according to the invention are at least as efficient as the known products while having an improved resistance to temperature.

The following examples are given by way of illustration without in any way limiting the scope of the invention:

Examples 1 to 4 illustrate lignosulfonic acids modified by hydrogen peroxide.

Lignosulfonic acids is used in the form of an aqueous solution containing 100 g to 600 g acid per liter of solution; the pH of such a solution is about 1 or below.

The solution is mixed with the hydrogen peroxide used generally in the form of a 100 volumes solution (a solution such that, by decomposition are formed 110 normal liters of gaseous oxygen per liter of solution). 5 to 30 g of hydrogen peroxide at 110 volumes (or an equivalent quantity of oxygen at 110 volumes when the hydrogen peroxide occurs in another concentration) are used for 100 g lignosulfonic acid contained in the solution.

EXAMPLE 1

The feed was an ammonium lignosulfonate which was subjected to an ion exchange resin in order to obtain a lignosulfonic acid solution having a pH equal to 0.7. This solution contained 360 g acid per kilogram of solution. 54 g hydrogen peroxide at 110 volumes are added and the autoclave is closed.

The autoclave is then heated at a speed of 4° C. per minute until the obtention of a temperature T; this temperature is maintained during a period of 1 minute and the autoclave is then cooled to ambient temperature.

The product obtained has a transformed lignosulfonic acid content of 34% by weight; this solution has a viscosity given in Table I, herein after.

EXAMPLE 2

The example herein-above is repeated at a temperature T of 135° C. while varying the duration of the reaction.

The solutions obtained have viscosities listed in Table II, herein after.

EXAMPLE 3

The solutions obtained in Examples 1 and 2 are neutralized to pH 5 with ghe use of an aqueous NaOH solution. The solutions may be used in this form, concentrated by evaporation or dried by any known means and especially by pulverization in a hot air flow.

TABLE I

| Viscosity of the solution in centipoises at 20° C. | 100 | 1000 | 5000 | 50000 |
|---|---|---|---|---|
| Temperature T °C. | 115 | 125 | 135 | 150 |

TABLE II

| Duration of the reaction (in minutes) | 1 | 15 | 30 |
|---|---|---|---|
| Viscosity of the solution in centipoises at 20° C. | 5000 | 8000 | 15000 |

TABLE III

| | VA | VP | Yv* | Gel 0/10 | Filtrate API 30 min |
|---|---|---|---|---|---|
| Immediate measurements | 5 | 4,5 | 1 | 1/5 | 5 |
| After aging of the mixture at 150° C. during 24 h under stirring | 7 | 4 | 6 | 5/12 | 8 |

*Yv = difference between apparent viscosity and plastic viscosity X2.

EXAMPLE 4

Use of modified lignosulfonates for the preparation of drilling muds—

The transformed lignosulfonate used in this example is that obtained in Example 1 at a temperature of 135° C. which was neutralized by NaOH and dried in order to obtain a powder.

This transformed lignosulfonate was tested as an additive to drilling muds in accordance with API standards; thus, the apparent viscosity (AV), plastic viscosity (PV), Yield value (Yv), gel 0, gel 10 and non-corrected 30 minutes API filtrate were measured on the following slurry:

distilled water: 1000 g
product to be tested: 30 g
NaOH q.s.p. at pH 8.5
Na-bentonite: 80 g
filler clay (montmorillonite): 80 g.

The results obtained are listed in Table III, attached hereto.

The same steps as carried out previously were made on the following slurry:

sea water (containing 26.5 g/l sodium chloride and 7.3 various salts): 1000 g
NaOH: 80 g
Na-bentonite: 50 g
attapulgite: 50 g
carboxymethyl cellulose: 8 g
product to be tested: 30 g
filler clay (montmorillonite): 150 g.

The results obtained are listed in Table IV, herein after.

TABLE IV

| | VA | VP | Yv | Gel 0/10 | Filtrate API 30 min |
|---|---|---|---|---|---|
| Immediate measurements | 38 | 26 | 24 | 26/68 | 6 |
| After aging of the mixture at 165° C. during 24 h under stirring | 21 | 12 | 18 | 14/77 | 13 |

TABLE V

| Viscosity of the solution in centipoises | 60 | 450 | 3500 | 42000 |
|---|---|---|---|---|
| Temperature T °C. | 115 | 125 | 135 | 150 |

TABLE VI

| | Total sulphur % | Mineral sulphur % | Organic sulphur % |
|---|---|---|---|
| Lignosulfonic acid feed | 7,9 | 1,75 | 6,1 |
| Product obtained according to Example 5 | 7,8 | 3,55 | 4,3 |

EXAMPLE 5

A feed consisting of ammonium lignosulfonate is treated by an ion exchange resin in order to obtain a lignosulfonic acid solution having a pH of 0.7. This solution contains 360 g acid per kilogram of solution.

The autoclave is closed and then heated at a speed of 4° C. per minute until the obtention of a temperature T° C., whereupon 22 g of ozonized oxygen is injected. The same conditions are maintained during one minute and then the autoclave is cooled to ambient temperature.

The solution obtained has a transformed lignosulfonic acid content of 35.5% by weight having a viscosity given in Table V, herein above. It is noted that the transformed lignosulfonic acid has a mineral sulphur to organic sulphur ratio higher that of the initial lignosulfonic acid, as may be seen in Table VI, herein above.

EXAMPLE 6

Example V is repeated while varying the duration of the reaction at a temperature T of 135° C.

Table VII, herein after, gives the viscosities of the solutions obtained.

EXAMPLE 7

The solutions obtained in Examples 5 and 6 are neutralized to pH 5 with a NaOH aqueous solution. They may be used in this form, or concentrated by evaporation, or possibly dried by any of the known means and especially by pulverization in a hot air flow.

TABLE VII

| Duration of the reaction in minutes | 1 | 15 | 30 |
|---|---|---|---|
| Viscosity of the solution in centipoises at 20° C. | 3500 | 6500 | 13000 |

TABLE VIII

| | VA | VP | Yv | Gel 0/10 | Filtrate API 30 min |
|---|---|---|---|---|---|
| Immediate measurements | 11 | 7 | 8 | 6/18 | 6 |
| After aging of the mixture at 165° C. during 24 h under stirring | 16 | 7 | 18 | 9/30 | 10 |

TABLE IX

|                                                                | VA | VP | Yv | Gel 0/10 | Filtrate API 30 min |
|----------------------------------------------------------------|----|----|----|----------|---------------------|
| Immediate measurements                                         | 25 | 13 | 24 | 10/40    | 9                   |
| After aging of the mixture at 165° C. during 24 h under stirring | 30 | 16 | 28 | 19/80    | 21                  |

EXAMPLE 8

The modified lignosulfonates obtained according to the method of the previous examples, are very efficiently used for the preparation of drilling fluids.

The transformed lignosulfonate, of Example 6, neutralized by NaOH and dried to obtain a powder is tested for its use as an additive to drilling muds defined by the API standards. Thus, measurements are made of the apparent viscosity (AV), plastic viscosity (PV), Yield Value (Yv) (thus the double of the difference between the AV and PV), gel 0, gel 10 and the non-corrected 30 minute API filtrate on the following slurry:

distilled water: 1000 g
product to be tested: 30 g
NaOH: quantity sufficient to reach pH 8,5.
Na-bentonite: 80 g
filler clay (montmorillonite): 80 g.

The results obtained are given in Table VIII, herein above.

EXAMPLE 9

The tests of Example 8 are repeated on a slurry having the following composition:

sea water (containing 26,5 g/l Nacl and 7,3 g/l various salts): 1000 g
NaOH: 8 g
Na-bentonite: 50 g
attapulgite: 50 g
carboxymethylcellulose: 8 g
product to be tested: 30 g
filler clay (montmorillonite): 150 g.

The results obtained are given in Table IX, herein above.

TABLE X

| Viscosity of the solution in centipoises at 20° C. | 85  | 900 | 47000 | 45000 |
|----------------------------------------------------|-----|-----|-------|-------|
| Temperature T °C.                                  | 115 | 125 | 135   | 150   |

TABLE XI

|                                    | Total sulphur % | Mineral sulphur % | Organic sulphur % |
|------------------------------------|-----------------|-------------------|-------------------|
| Lignosulfonic acid feed            | 7.9             | 1.75              | 6.1               |
| Product obtained according to Example 10 | 7.8       | 3.9               | 3.9               |

TABLE XII

| Duration of the reaction in minutes               | 1     | 15   | 30    |
|---------------------------------------------------|-------|------|-------|
| Viscosity of the solution in centipoises at 20° C. | 47000 | 7200 | 14500 |

EXAMPLE 10

Before closing the autoclave, 45 g sodium hypochlorite was added to the feed of Example 5; the operating conditions are identical to those of Example 5.

The solution obtained has a transformed lignosulfonic acid content of 34.5% by weight and a viscosity as shown in Table X, herein above.

The transformed lignosulfonic acid has a mineral sulphur content higher than the lignosulfonic acid feed as shown in Table XI, herein above.

EXAMPLE 11

Operating steps of Example 10 are repeated varying the reaction duration at temperature T of 135° C.

Table XII, herein above, gives the viscosities of the solutions obtained.

The solutions obtained in Examples 10 and 11 may be neutralized with an alkaline aqueous solution, alkaline or alkaline-earth hydroxide, alkaline or alkaline-earth carbonates, up to pH 5, and be used as additives in that form, or be concentrated by evaporation or dried by any known means and especially by pulverization in a hot air flow.

EXAMPLE 12

Use of the transformed lignosulfonate, obtained according to Example 6, and desiccated to a powder, as an additive to a soft water slurry such as that defined in Example 8.

The tests are carried out in the conditions of Example 8 and give the results compiled in Table XIII, herein after.

TABLE XIII

|                                                                | VA | VP | Yv | Gel 0/10 | Filtrate API 30 min |
|----------------------------------------------------------------|----|----|----|----------|---------------------|
| Immediate measurements                                         | 18 | 13 | 10 | 7/20     | 6.5                 |
| After aging of the mixture at 165° C. during 24 h under stirring | 24 | 14 | 20 | 10/37    | 11                  |

TABLE XIV

|                                                                | VA | VP | Yv | Gel 0/10 | Filtrate API 30 min |
|----------------------------------------------------------------|----|----|----|----------|---------------------|
| Immediate measurements                                         | 28 | 15 | 26 | 12/45    | 9.5                 |
| After aging of the mixture at 165° C. during 24 h under stirring | 35 | 18 | 34 | 21/89    | 26                  |

EXAMPLE 13

The product obtained from Example 12 is tested in a sea water slurry such as used in Example 9 and under identical conditions.

The results obtained are given in Table XIV, herein above.

This invention is in no way confined to the Examples and embodiments described above; many variant forms are possible for someone skilled in the art, depending on applications, and without any departure from the spirit of the invention.

What is claimed is:

1. A process for the preparation of lignosulfonic acid derivatives which comprises:

(a) heating in a pressure and corrosion resistant closed container for a period of about 1 to 30 minutes, at temperatures within a range of 115° C. to 160° C., a mixture of a lignosulfonic acid aqueous solution having a pH lower than 3, containing from 100 g to 600 g of the acid per liter, and an inorganic oxidizing agent selected from the group consisting of hydrogen peroxide, ozonized oxygen, alkaline chlorites and alkaline hypochlorites, supplying 0.5 to 2 g oxygen per 200 g lignosulfonic acid to form a reacted mixture, and (b) neutralizing said reacted mixture with an alkaline solution to a pH at least equal to 5 to obtain a mixture containing transformed lignosulfonic acid.

2. Process according to claim 1, wherein the alkaline solution is selected from the group consisting of solutions of hydroxides and carbonates of alkali metals and alkaline earth-metals.

3. The novel product obtained by the process of claim 1, comprising alkaline salts of lignosulfonic acid, in which the ratio of organic sulphur/mineral sulphur is reduced by the oxidizing reaction.

4. An aqueous drilling mud or completion fluid containing a viscosity reducing or water retention improving amount of the lignosulfonic acid derivatives free of multivalent metals and prepared by the process of claim 1.

5. An aqueous drilling mud or completion fluid containing a viscosity reducing or water retention improving amount of the product of claim 3.

* * * * *